May 16, 1961 G. BRADFIELD 2,984,756
LAUNCHING MECHANICAL WAVES
Filed June 4, 1956
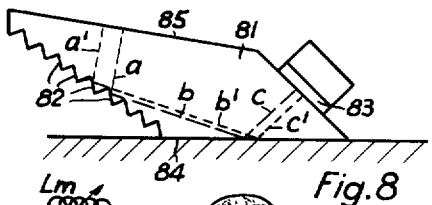
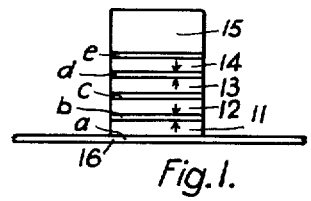
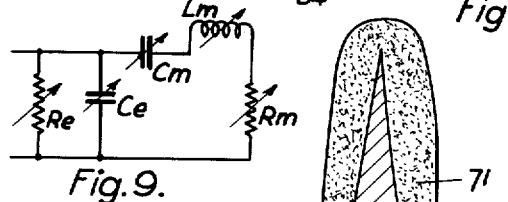
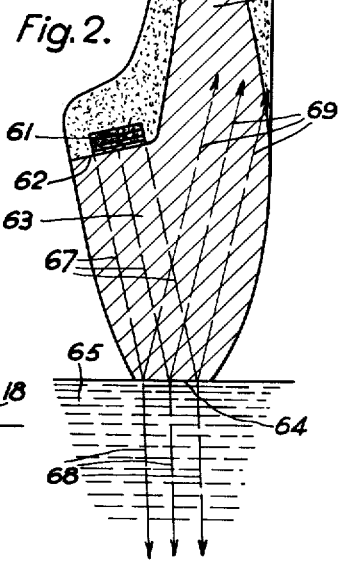
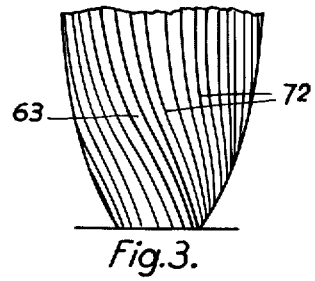
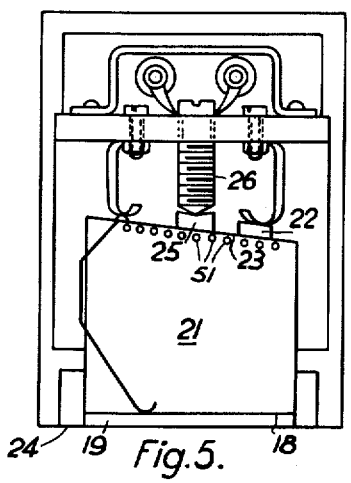
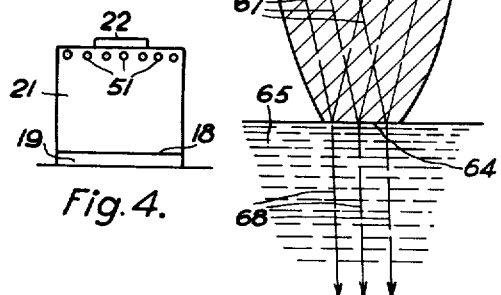
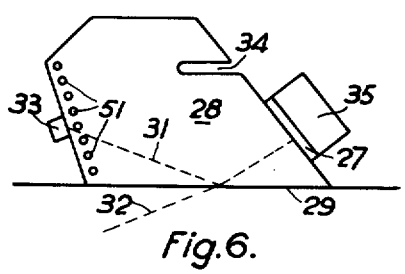
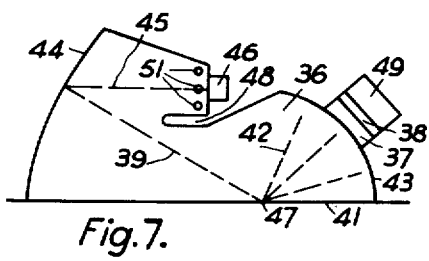
INVENTOR:
GEOFFREY BRADFIELD
By:
Stevens, Davis, Miller & Mosher
Attorneys

United States Patent Office 2,984,756
Patented May 16, 1961

2,984,756
LAUNCHING MECHANICAL WAVES

Geoffrey Bradfield, National Physical Laboratory, Teddington, England

Filed June 4, 1956, Ser. No. 589,277

Claims priority, application Great Britain June 6, 1955

5 Claims. (Cl. 310—9.4)

This invention relates to apparatus for launching mechanical vibrations generally at ultrasonic frequencies into specimens for instance for the purpose of location of hidden flaws by reflection of the vibrations.

Apparatus of this kind using piezo-electric transducers for launching and receiving the vibrations is well known.

One object of the present invention is to provide a piezo-electric transducer structure which will operate over a wide frequency range e.g. a range of 2:1 or even more.

Such a structure is useful, for example, in materials testing because by working at two different frequencies additional valuable data can often be obtained. Thus in the case of testing of structural members such as aircraft spars while immersed, valuable data can be obtained in this way at a comparatively small increase in the cost and complexity of the equipment which is in any case necessary for such work.

Another object of the invention is the provision of a mounting arrangement for the transducer structure to be used for immersed-specimen testing which will avoid difficulties due to reflection at the interface between the mounting and the liquid.

An important factor in the use of the apparatus for solid contact with a specimen is the quality of contact between the transducer and the specimen (or a wedge and the specimen where a wedge is used between the transducer and specimen to effect a change of mode) which depends, for instance, on such factors as surface finish, pressure and thickness of an intervening film of oil.

What might be called perfect contact can hardly be achieved in practice and in consequence there is a loss by reflection at the interface, dependent upon quality of contact achieved. I have previously proposed to assess the quality of contact by the use of a small monitoring transducer on the back of a backing of dissipative material mounted on the launching transducer. Such a monitoring transducer is primarily responsive to a small part of the total area of contact and an object of the present invention is the provision of monitoring means which will enable the effect of local points of different quality of contact from the average to be avoided, even though the monitoring means is primarily responsive to a small part of the total area of contact.

A further object of the invention is the provision of means whereby the quality of contact between the transducer or wedge and the specimen may be evaluated without the use of a monitoring transducer and without localised effects.

The invention will be described with reference to the accompanying diagrammatic drawings, in which Figure 1 is an elevation of a piezo-electric transducer structure which will operate at a wide range of frequencies.

Figure 2 is a sectional elevation illustrating a mounting for the structure of Figure 1, for use in propagating a beam of vibrations in a liquid medium.

Figure 3 is a detail elevation of the lower part of Figure 2.

Figures 4, 5, 6 and 7 show various arrangements of launching apparatus provided with a small monitoring transducer and with means for making the monitoring transducer responsive to the average value of the contact quality.

Figure 8 is an elevation of an arrangement for launching shear waves in a specimen by the provision of a wedge between the transducer of Figure 1 and the specimen, the arrangement incorporating means whereby the quality of contact between the wedge and the specimen may be evaluated without the use of a monitoring transducer.

Figure 9 is part of a circuit diagram.

Referring now to Figure 1, this illustrates a structure which can be used to produce a range of frequencies including the ratio 2:1.

The structure consists of three or four equally thick piezo-electric crystals 11, 12, 13 and, if there are four, 14, with their surfaces metallised as at $a$, $b$, $c$, $d$, $e$, firmly cemented together and preferably cemented to a backing 15 of the dissipative type. The metallising $a$ at the opposite end from the backing 15 is preferably in the form of or fast to a metallic diaphragm 16. The term "crystal" is used for convenience and the crystals 11 to 14, may, in fact, be plates of ceramic piezo-electric material such as barium titanate which may have admixtures of calcium titanate and/or lead titanate or of zirconates or niobates. One suitable composition comprises 96 percent of barium titanate and 4 percent of lead titanate and in that case the diaphragm 16 can be of Nilo K in order to give freedom differential thermal expansion effects in use and in fabrication. Such ceramic materials have the advantage that the high capacity makes straight capacities less important. For a structure to be operated as described below at frequencies of from 0.7 up to 6.5 mc/s., a suitable thickness for titanate ceramic crystals is 0.015 inch.

The invention is not confined to ceramic piezo-electric materials, as excellent results can be obtained using quartz. If the layers are of X-cut alpha quartz crystals, by aligning the Y axes in the several layers, trouble due to anisotropic thermal expansion in alpha quartz can be minimised. The metal diaphragm 16 can then suitably be of titanium, since this provides a good match for quartz, both acoustically and as regards thermal expansion. For the above frequencies, a suitable thickness for quartz plates is 0.017 inch.

The dissipative backing 15 is desirably made of a dense powder such as tungsten or carbonyl iron, embedded in a plastic material also containing fibrous materials such as asbestos. Still better, in moulding the backing the lower part of the mould is filled with a mixture of the dense powder and plastic and the upper part with a mixture of the dense powder, plastic and asbestos fibres. After thermo-setting, the lower part is used against the transducer so that the fibrous part constitutes the termination.

With the structure as described above, and for a range of operation from 0.7 to 6.5 mc./s., the connections are as tabulated below:

|  | 0.7 mc./s. to 1.8 mc./s. | 1.8 mc./s. to 3.0 mc./s. | 3.0 mc./s. to 6.5 mc./s. |
|---|---|---|---|
| Connect to earth | a to b to d to e | e to c to a | a, b and c |
| Supply input pulse to | c | b | d and e |

Crystal 11 is poled $a$ to $b$, 12 poled $c$ to $b$, 13 poled $c$ to $d$ and 14 poled $e$ to $d$.

Over the range of column 1 there will be compression waves in crystals 12, 13 simultaneously, over the range of column 2 in crystals 11, 12 simultaneously and over the range of column 3 the wave will be generated only in crystal 13.

In the particular case of the range of column 2, a monitoring output can be collected from the electrode surface $d$. This output depends on the energy reflected back from the diaphragm 16 i.e. from the interface between the transducer structure and a specimen to which it is applied and it is therefore indicative and will serve to evaluate the contact quality with the specimen. Since the monitoring crystal is of the same size as the others, an averaging effect for the whole area of contact will be obtained.

In Figures 2 and 3 a piezoelectric transducer structure indicated generally at 61 and of the same construction as above described with reference to Figure 1 is mounted on a flat face 62 of a metal block 63. The lower part of the metal block tapers towards a flat bottom surface 64 which forms the interface with a liquid 65 into which the vibrations are to be propagated. The block also has an upwardly tapering portion 66 adjacent the face 62. and the form of the block is such that the beam of longitudinal vibrations indicated by the rays 67 enters the liquid as at 68, while owing to the mismatch between the material of the block and the liquid the reflected beams 69 pass up into the upwardly tapering part 66. This part 66 is so shaped that the vibrations are not reflected downward again but are dissipated in a backing 71 which covers the part 66, the back of the transducer 61 and that part of the surface 62 which is not covered by the transducer itself. This backing may be of the composition above described, namely a heavy powder and a fibrous material in a plastic. To avoid coherent reflection from the sides of the lower part 63 it may be provided externally with grooves 72 arranged in a steep spiral formation.

If the transducer structure 61 is of quartz the metal block may be of titanium, the angle of the beam 67 to the normal to the surface 64 may be 13° and the angle of the spiral grooves 72 may be 10° to the axis. By means of this device powerful vibrations over a wide frequency range may be launched into a liquid medium such as water, for instance for the testing of an immersed specimen such as an aircraft spar.

Figures 4 to 7 all show transducer arrangements in which there is a relatively small monitoring transducer by which reflection at the interface with the specimen can be evaluated. In Figures 4 and 5 the monitoring transducer is at 22 on the back of a dissipative backing 21 of the above mentioned composition mounted on the back of a transducer crystal 19, having an electrode 18.

In Figures 6 and 7 a wedge is used between the transducer and the specimen in order to obtain a change of mode.

In Figures 4 and 5 the output pulse from the monitoring transducer 22 diminishes as the contact quality with the specimen improves. With this construction it has been found useful to slope the rear 23 surface of the backing 21 (Fig. 5), that is to say, to let it be bounded by a plane not quite parallel to the diaphragm 24 which is applied to the specimen and to make the subsidiary transducer 22 in the form of a narrow bar located to lie parallel with the plane of the diaphragm 24. Conveniently the subsidiary transducer 22 is made laterally displaceable to enable a central pressure pad 25 to be fixed to the backing 21 as usual by the aid of which and a screw 26 the transducer is pressed against the specimen (as shown in Fig. 5).

In Figure 6 the transducer 27 is mounted on one face of a wedge 28 of low velocity material such as polymethyl methacrylate resin or the composite material disclosed in British Patent No. 766,983. In such cases at the interface 29 between the wedge and the specimen the longitudinal wave splits into a longitudinal reflected wave 31 a reflected mode-changed shear wave not shown at a steeper angle and the desired shear wave 32 transmitted into the specimen. For such a case the construction shown in Fig. 6 provides a small subsidiary transducer 33 placed on a face of the wedge so as to intercept the reflected longitudinal wave 31. Desirably, this subsidiary transducer 33 is in the form of a narrow bar extending parallel to the face to which the main transducer 27 is applied and is itself mounted on a face of the wedge the normal to which as shown is inclined to the direction of the intercepted longitudinal reflected wave 31 thereby to reduce clutter. There may be a saw cut 34 in the wedge near the face on which the main transducer 27 is mounted and damping material such as 35 may be used at various points to reduce clutter.

Such an arrangement is only suitable for fixed directions of propagation of the vibrations. It can be developed, however, to deal with variable directions by constructing a mode changing wedge with a cylindrical or spherical surface over which slides a shoe to which the transducer is applied. This is shown in Fig. 7 where 36 is the wedge, 37 the shoe and 38 the transducer. As before there will be a reflected longitudinal wave 39 at the interface 41, but as the direction of the longitudinal wave 42 reaching the interface from the main transducer will vary according to the adjustment of the shoe 37 over the curved surface 43 of the wedge, the direction of the reflected longitudinal wave 39 will vary in correspondence. To deal with this a surface 44 is provided on the wedge by which the reflected longitudinal wave 39 is again reflected, and this surface 44 is curved in such a way that the re-reflected ray 45 is always directed through a particular point on another surface, and at this point we locate the subsidiary transducer 46. It will be clear to those skilled in the art that if the main wedge surface 43 is cylindrical about an axis 47 lying in the interface 41, then the second reflecting suface 44 will be an elliptical cylinder having one focal axis at the axis 47, and the other focal axis at the location of the subsidiary transducer 46 which will again be of bar form. Likewise of the main wedge surface is part spherical about a centre lying in the interface, then the second reflecting surface 44 will be ellipsoid having one focus at the centre of the sphere and the other focus located at the second transducer 46.

To reduce clutter there may be a saw cut 48 in the wedge separating the region where the subsidiary transducer 46 is mounted from the part in which the main transmission takes place and there may also be damping material as at 49 on various surfaces to reduce undesired reflections.

In the constructions shown in Figures 4 to 7 a narrow bar-like crystal is used as the monitoring transducer and to avoid its response being confined mainly to reflection from that part of the interface which lies immediately below it or in the path of the reflected rays in Figs. 6 and 7 a series of obstacles or holes 51 is provided in each case in such a position as to ensure that a scattered signal is picked up by the monitoring transducer from the reflected wave, the signal being substantially independent of the phase of the various component parts. In the arrangement of Figures 4 and 5 these holes or obstacles 51 are located just below the rear surface of the backing 21 while in Figures 6 and 7, they are provided correspondingly below the surface on which the monitoring transducer is mounted.

Another method which has been used successfully is to locate, on the sloping surface of the backing 21, Fig. 5, a barium titanate or similar crystal with slots parallel to the line of intersection of the sloping back with the radiating face. These slots will break up the surface of the barium titanate crystal and the width of the slots is chosen so that alternate slots are approximately 80° out of phase or rather less. The total signal from this crystal is derived by tapping the inner face and outer face crystals on to the appropriate end tap of a centre tapped output transformer. Naturally all this difficulty can be avoided if the backing is made of sufficient length to permit the rear surface to be parallel to the front surface and yet, on account of the high attenuation in the backing, the reflected signal is received at the lower crystal at an intensity insufficient to cause confusion in regard to the signals received in the normal way on its front face. Such a scheme can also be employed in regard to the arrangement disclosed in Figures 6, 7 and 8.

A monitoring means which has also been found to be highly successful with a backed crystal is as follows. The main crystal is used in a bridge circuit and balanced by a network consisting of a parallel variable capacitor shunted by a small variable resistance. In parallel with this capacitor is a series circuit consisting of a variable condenser, a variable inductance and a variable resistance. This network forms one arm of a bridge and the main barium titanate crystal forms the other, the bridge being as described in application Serial No. 295,109, filed May 27, 1952, now matured into Patent No. 2,803,129. The bridge is balanced with the crystal not in contact with the specimen and a good contact then provides a large out of balance signal, a worse surface a less signal and so on; thus the larger the signal the better the surface with which the main crystal makes contact. With this scheme no subsidiary crystal is essential, but it is useful to have such a crystal to indicate the magnitude of the signal launched in the backing, for it is the ratio of this (approximately at least) to the out of balance signal which indicates the quality of the contact. The advantage of this system is that very large changes of bridge circuit output are obtainable to indicate the extent of the contact difference, and furthermore an automatic averaging of the effect over the whole crystal surface is obtained.

Figure 8 shows an arrangement in which a mode changing wedge is used and in which the same transducer serves both for launching vibrations into the specimen and for evaluating the value of the contact quality. It also avoids the effect of local variations in contact quality since it averages the response for the whole interface. It requires a transducer which is operable at two different frequencies in the ratio of 2:1 and the structure above described with reference to Figure 1 is used.

Here the wedge 81 is provided with steps as at 82 on one surface so that a wave from the transducer at 83 is reflected at the wedge specimen interface at 84 and then at these steps. It is then reflected at surface 85. The geometry is such that, for example, the paths $2(a+b+c)$ differs from the path $2(a'+b'+c')$ by a half wavelength at the lower frequency which is used in flaw investigations. This ensures that components of the wave from adjacent steps reflected back to 83 arrive out of phase and substantially cancel one another. On the other hand, at the higher frequency which is used for monitoring they will be in phase and integration over the reflecting contact surface at 84 will have been achieved.

In an alternative the steps 82 are replaced by an array of parallel scatterers located in successive parallel planes spaced $d$ apart to form a pattern. If now a beam of radiation of wave length making an angle $\theta$ with the planes meets the assembly a diffracted beam will result at an angle $\theta$ provided that the Bragg condition $n=2d \sin \theta$ is satisfied, $n$ being an integer (see for instance, Applied X Rays" by Clark, pp. 80–90). If a frequency is chosen such that $n=1$ when the reflected ray is required i.e. when the contact quality is to be evaluated then the use of the lower frequency results in a value of $n=\frac{1}{2}$ and the beam is extinguished and will not be received at 83.

It will be understood that in the last two arrangements the transducer structure is used both for generation and reception of the signal as in application serial No. 295,109, filed May 27, 1952, now matured into Patent No. 2,803,129.

The arm of such a bridge circuit used to balance the transducer is shown in Figure 9, and it incorporates five variable elements, $Re$, $Ce$, $Cm$, $Lm$ and $Rm$. This is to be preferred but the device still works if only two, i.e. the series variable condenser $Cm$ and the series variable resistance $Rm$ be adjustable, the other elements being preset. It is advantageous to include these preset elements in the probe head and then this can be readily interchanged for another. It is also advantageous to use a stabilized titanate as mentioned above.

I claim:

1. Apparatus for launching mechanical vibrations in a liquid medium comprising a block of highly elastic fine grained material having a flat mounting face, a lower part tapering from said flat face to a flat bottom face constituting an interface for the liquid, an upwardly tapering portion adjacent said flat mounting face shaped to receive substantially all the rays reflected from the interface and to avoid their re-reflection towards the interface, a piezo-electric transducer mounted on said mounting face and dissipative backing on said upper part of the transducer.

2. Apparatus as set forth in claim 1 having the lower part of said block provided externally with grooves arranged in a steep spiral formation to avoid coherent reflection from the sides.

3. A piezo-electric transducer for excitation at a range of frequencies comprising a stack of at least three and not more than four equally thick piezo-electric crystals poled in alternating order, electrode surfaces between the crystals of the stack, further electrode surfaces on the end faces of the stack, the whole stack being firmly cemented together, separate leads extending from each electrode surface, an exciting circuit, and means for switching said leads in a plurality of different schemes of connection to match the stack to the frequency of the exciting circuit.

4. A piezo-electric transducer according to claim 3 comprising a stack of four crystals, and switching means which in a first position connects each end electrode surfaces and the two intermediate electrode surfaces nearest the end surfaces to earth and connects the remaining electrode surface to the output terminal of the exciting circuit, in a second position connects both end electrode surfaces and the mid intermediate electrode surface to earth and connects one of the other intermediate electrode surfaces to the output terminal of the exciting circuit, and in a third position connects one end electrode surface and the next two intermediate electrode surfaces to earth and connects the remaining intermediate electrode surface and the other end electrode surface to the output terminal of the exciting circuit.

5. The combination with a piezo-electric transducer according to claim 4 of a monitoring circuit, said switching means in its second position connecting the remaining intermediate electrode surface to said monitoring circuit and in its other two positions disconnecting said monitoring circuit.

References Cited in the file of this patent

UNITED STATES PATENTS

| | | |
|---|---|---|
| 2,569,987 | Frondel | Oct. 2, 1951 |
| 2,625,035 | Firestone | Jan. 13, 1953 |
| 2,649,550 | Hardie et al. | Aug. 18, 1953 |
| 2,656,725 | Frederick et al. | Aug. 28, 1953 |
| 2,667,780 | Valkenburg | Feb. 2, 1954 |
| 2,685,041 | Bradfield | July 27, 1954 |
| 2,697,936 | Farrow | Dec. 28, 1954 |
| 2,707,755 | Hardie et al. | May 3, 1955 |
| 2,709,760 | Valkenburg | May 31, 1955 |
| 2,729,757 | Goodman | Jan. 3, 1956 |

FOREIGN PATENTS

| | | |
|---|---|---|
| 265,181 | Great Britain | Jan. 26, 1928 |
| 622,035 | France | May 21, 1927 |
| 1,065,907 | France | Jan. 13, 1954 |